United States Patent
Cao (10) Patent No.: US 9,892,099 B2
(45) Date of Patent: Feb. 13, 2018

(54) INTELLIGENT READING FOR ACCESSING MULTI-PAGE DATA FROM A WEB BROWSER

(71) Applicant: ZTE Corporation, Shenzhen (CN)

(72) Inventor: Gang Cao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/028,507

(22) PCT Filed: Apr. 15, 2014

(86) PCT No.: PCT/CN2014/075428
§ 371 (c)(1),
(2) Date: Apr. 11, 2016

(87) PCT Pub. No.: WO2014/180227
PCT Pub. Date: Nov. 13, 2014

(65) Prior Publication Data
US 2016/0253295 A1    Sep. 1, 2016

(30) Foreign Application Priority Data
Oct. 11, 2013   (CN) .......................... 2013 1 0474508

(51) Int. Cl.
G06F 17/30     (2006.01)
G06F 17/22     (2006.01)

(52) U.S. Cl.
CPC ...... *G06F 17/2247* (2013.01); *G06F 17/2235* (2013.01); *G06F 17/3089* (2013.01); *G06F 17/30899* (2013.01)

(58) Field of Classification Search
CPC . G06F 17/2247; G06F 17/30; G06F 17/30864
(Continued)

(56) References Cited

U.S. PATENT DOCUMENTS 6,282,542 B1    8/2001  Carneal
2002/0010761 A1 1/2002  Carneal
(Continued)

FOREIGN PATENT DOCUMENTS

CN    101866362 A    10/2010
CN    101968708 A    2/2011
(Continued)

OTHER PUBLICATIONS

Supplementary European Search Report in European application No. 14794157.9, dated Oct. 4, 2016.
(Continued)

*Primary Examiner* — Cesar Paula
*Assistant Examiner* — Carl E Barnes, Jr.
(74) *Attorney, Agent, or Firm* — Oppedahl Patent Law Firm LLC (57) ABSTRACT

Disclosed in an embodiment of the present invention are a method, device, terminal and computer storage medium for realizing intelligent reading of a browser, the method comprising: retrieving from the K-th page the link information of a candidate (K+1)-th page label according to a previous setting, and selecting the candidate (K+1)-th page label having the maximum similarity with the link information of the K-th page as the real (K+1)-th page label, K being a positive integer; pre-loading the (K+1)-th page according to the link information of the real (K+1)-th page label; acquiring the text content of the (K+1)-th page, and joining the text content on the (K+1)-th page to the K-th page.

12 Claims, 4 Drawing Sheets

(58) Field of Classification Search
USPC .......................................................... 715/234
See application file for complete search history.

(56) References Cited

U.S. PATENT DOCUMENTS

| | | |
|---|---|---|
| 2003/0120658 A1 | 6/2003 | Carneal |
| 2004/0049541 A1 | 3/2004 | Swahn |
| 2009/0083263 A1 | 3/2009 | Felch |
| 2010/0077343 A1* | 3/2010 | Uhl ..................... G06F 3/04855 715/787 |
| 2010/0131870 A1* | 5/2010 | Park ..................... G06F 3/0481 715/760 |
| 2011/0295830 A1 | 12/2011 | Swahn |
| 2012/0005192 A1* | 1/2012 | Bao ................... G06F 17/30882 707/721 |
| 2012/0042279 A1* | 2/2012 | Naderi ................ G06F 3/04855 715/786 |
| 2012/0198342 A1* | 8/2012 | Mahmud .................. G06F 8/30 715/733 |
| 2012/0311353 A1 | 12/2012 | Felch |
| 2013/0227398 A1* | 8/2013 | Bolstad ................. G06F 17/212 715/236 |
| 2013/0311806 A1 | 11/2013 | Felch |
| 2014/0082484 A1* | 3/2014 | Han ..................... G06F 17/2247 715/234 |
| 2014/0380144 A1* | 12/2014 | Liang ................ G06F 17/30902 715/234 |
| 2014/0380200 A1 | 12/2014 | Swahn |

FOREIGN PATENT DOCUMENTS

| | | |
|---|---|---|
| CN | 102982181 A | 3/2013 |
| JP | 2001242980 A | 9/2001 |
| WO | 9908429 A1 | 2/1999 |

OTHER PUBLICATIONS

International Search Report in international application No. PCT/CN2014/075428, dated Jul. 16, 2014.
English Translation of the Written Opinion of the International Search Authority in international application No. PCT/CN2014/075428, dated Jul. 16, 2014.

\* cited by examiner

INTELLIGENT READING FOR ACCESSING MULTI-PAGE DATA FROM A WEB BROWSER

TECHNICAL FIELD

The disclosure relates to the technical field of browsers, and in particular to a method and apparatus for implementing intelligent reading on a browser, a terminal and a computer storage medium.

BACKGROUND

With the rapid development of a wireless communication technology and an internet technology, more and more users currently surf the internet using browsers on mobile terminals such as smart phones.

In order to improve the browser using experience of a user, each device provider or solution provider proposes multiple improvement solutions for all functions of a browser, one being an additional browser function proposed to facilitate browsing multi-page news or novel web pages by the user. By means of the additional reading function, the browser can automatically join text contents of the multi-page news or novel web pages together to allow the user to browse the contents easily, thereby assisting the user to eliminate a frequent page turning operation; and the user does not need to wait for a next page loading process for a long time more frequently.

However, the following problems about the current implementation of the additional reading function on the browser need to be urgently solved.

Firstly, a reading mode supported by a conventional browser only refers to simply searching for a similar text label such as 'next page' and searching for a link address of a next page following a current web page based on the text label. However, under an actual situation, there may be more than one text label in the web page, and there may be a large number of similar labels. The problem that contents of the next page cannot be correctly loaded due to wrong finding or missing of a real next page link address is likely to be caused.

Secondly, when the text contents of the next page are extracted in the reading mode supported by the conventional browser, the contents of the whole web page are usually extracted. For example, the loaded text contents may further include all contents from a previous node of the page to a subsequent node of the page.

In addition, when the text contents of the loaded page are extracted in the conventional art, some duplicate contents in each page will be repeatedly extracted. Thus, on one hand, the overhead of the terminal processing capacity is increased, and on the other hand, the reading experience of the user is influenced to a certain extent.

SUMMARY

The embodiments of the disclosure provide a method and apparatus for implementing intelligent reading on a browser, a terminal and a computer storage medium, which enable text contents of a next page to be extracted and joined so as to be capable of greatly improving the reading experience of a user.

The embodiments of the disclosure are implemented using the technical solutions as follows.

An embodiment of the disclosure provides a method for implementing intelligent reading on a browser, including: link information of candidate (K+1)-th page labels is retrieved from a K-th page according to pre-settings, and a candidate (K+1)-th page label having a maximum similarity with link information of the K-th page is selected as a real (K+1)-th page label, K being a positive integer;

a (K+1)-th page is pre-loaded according to link information of the real (K+1)-th page label; and text contents of the (K+1)-th page are obtained, and the text contents of the (K+1)-th page are joined to the K-th page.

In an embodiment, the step that the link information of the candidate (K+1)-th page labels is retrieved from the K-th page according to the pre-settings may include that: at least one (K+1)-th page loading identifier or automatic loading triggering policy is pre-set, and the link information of the candidate (K+1)-th page labels is retrieved from the K-th page according to the at least one (K+1)-th page loading identifier or automatic loading triggering policy, herein the (K+1)-th page loading identifier at least defines triggering the (K+1)-th page to be pre-loaded via a pre-set gesture or triggering the (K+1)-th page to be pre-loaded via a position of a vertical scroll bar, and the automatic loading triggering policy includes at least one mode of automatically triggering the (K+1)-th page to be pre-loaded via a pre-configured triggering rule.

In an embodiment, triggering the (K+1)-th page to be pre-loaded via the pre-set gesture may include:

detecting a triggering operation on a touch-sensitive screen; and when the triggering operation accords with the pre-set gesture, triggering the (K+1)-th page to be pre-loaded.

In an embodiment, triggering the (K+1)-th page to be pre-loaded via the position of the vertical scroll bar may include:

detecting a current position of the vertical scroll bar; and when the position of the vertical scroll bar matches a pre-set triggering position, triggering the (K+1)-th page to be pre-loaded.

In an embodiment, the step that the candidate (K+1)-th page label having the maximum similarity with the link information of the K-th page is selected as the real (K+1)-th page label may include that:

link information of all candidate (K+1)-th page labels is retrieved from the K-th page;

a similarity S between link information of each of the candidate (K+1)-th page labels and the link information of the K-th page is calculated, the similarity S satisfying the following expression:

S=T/N, where T is the number of identical characters of the link information of the each of the candidate (K+1)-th page labels and the link information of the K-th page at identical positions, and N is the number of characters of the link information of the K-th page; and a candidate (K+1)-th page label having a maximum similarity exceeding a pre-set threshold value is selected as the real (K+1)-th page label.

In an embodiment, the step that the text contents of the (K+1)-th page are obtained may include that:

all node sets of the K-th page and a real (K+1)-th page in a Document Object Model (DOM) tree are obtained respectively, and nodes, having the same attribute with nodes in the K-th page, in the real (K+1)-th page are filtered out; and lengths of texts included in residual nodes in the real (K+1)-th page are calculated, a node having the maximum text length is taken as a text node of the real (K+1)-th page, and the text contents of the (K+1)-th page are obtained according to the text node.

An embodiment of the disclosure also provides an apparatus for implementing intelligent reading on a browser, including:

a triggering and retrieving module, configured to retrieve link information of candidate (K+1)-th page labels from a K-th page according to pre-settings, K being a positive integer;

a main control module, configured to select a candidate (K+1)-th page label having a maximum similarity with link information of the K-th page from the candidate (K+1)-th page labels of which link information is retrieved by the triggering and retrieving module as a real (K+1)-th page label;

a web page pre-loading module, configured to pre-load a (K+1)-th page according to link information of the real (K+1)-th page label selected by the main control module;

a text extraction module, configured to obtain text contents of the (K+1)-th page pre-loaded by the web page pre-loading module; and a content joining module, configured to join the text contents of the (K+1)-th page obtained by the text extraction module to the K-th page.

In an embodiment, the triggering and retrieving module may be configured to pre-set at least one (K+1)-th page loading identifier or automatic loading triggering policy, and retrieve the link information of the candidate (K+1)-th page labels from the K-th page according to the at least one (K+1)-th page loading identifier or automatic loading triggering policy, herein the (K+1)-th page loading identifier at least defines triggering the (K+1)-th page to be pre-loaded via a pre-set gesture or triggering the (K+1)-th page to be pre-loaded via a position of a vertical scroll bar, and the automatic loading triggering policy includes at least one mode of automatically triggering the (K+1)-th page to be pre-loaded via a pre-configured triggering rule.

In an embodiment, the triggering and retrieving module may be configured to detect a triggering operation on a touch-sensitive screen, and trigger the (K+1)-th page to be pre-loaded when the triggering operation accords with the pre-set gesture.

In an embodiment, the triggering and retrieving module may be configured to detect the position of the vertical scroll bar, and trigger the (K+1)-th page to be pre-loaded when the position of the vertical scroll bar matches a pre-set triggering position.

In an embodiment, the main control module may be configured to: retrieve link information of all candidate (K+1)-th page labels from the K-th page; calculate a similarity S between link information of each of the candidate (K+1)-th page labels and the link information of the K-th page, the similarity S satisfying the following expression:

$S=T/N$, where T is the number of identical characters of the link information of the each of the candidate (K+1)-th page labels and the link information of the K-th page at identical positions, and N is the number of characters of the link information of the K-th page; and select a candidate (K+1)-th page label having a maximum similarity exceeding a pre-set threshold value as the real (K+1)-th page label.

In an embodiment, the text extraction module may be configured to obtain all node sets of the K-th page and a real (K+1)-th page in a DOM tree respectively, filter out nodes, having the same attribute with nodes in the K-th page, in the real (K+1)-th page, calculate lengths of texts included in residual nodes in the real (K+1)-th page, take a node having the maximum text length as a text node of the real (K+1)-th page, and obtain the text contents of the (K+1)-th page according to the text node.

In an embodiment, the triggering and retrieving module may include:

a first detection module, configured to detect the triggering operation on the touch-sensitive screen; and a first triggering module, configured to trigger the (K+1)-th page to be loaded when the triggering operation detected by the first detection module accords with the pre-set gesture.

In an embodiment, the triggering and retrieving module may include:

a second detection module, configured to detect the current position of the vertical scroll bar; and a second triggering module, configured to trigger the (K+1)-th page to be pre-loaded when the position of the vertical scroll bar, detected by the second detection module, matches the pre-set triggering position.

In an embodiment, the main control module may include:

a retrieval module, configured to retrieve the link information of all candidate (K+1)-th page labels from the K-th page;

a calculation module, configured to calculate the similarity S between the link information, of the each of the candidate (K+1)-th page labels, retrieved by the retrieval module and the link information of the K-th page, the similarity S satisfying the following expression:

$S=T/N$, where T is the number of the identical characters of the link information of the each of the candidate (K+1)-th page labels and the link information of the K-th page at the identical positions, and N is the number of the characters of the link information of the K-th page; and a determination module, configured to select the candidate (K+1)-th page label having the maximum similarity exceeding the pre-set threshold value as the real (K+1)-th page label according to a calculation result of the calculation module.

In an embodiment, the text extraction module may include:

a filtration module, configured to obtain all node sets of the K-th page and the real (K+1)-th page in the DOM tree respectively, and filter out the nodes, having the same attribute with nodes in the K-th page, in the real (K+1)-th page; and an extraction module, configured to calculate the lengths of the texts included in the residual nodes in the real (K+1)-th page, take the node having the maximum text length as the text node of the real (K+1)-th page, and obtain the text contents of the (K+1)-th page according to the text node.

An embodiment of the disclosure also provides a terminal, which includes the apparatus for implementing intelligent reading on a browser according to the embodiment of the disclosure. The terminal may include:

a triggering and retrieving module, configured to retrieve link information of candidate (K+1)-th page labels from a K-th page according to pre-settings, K being a positive integer;

a main control module, configured to select a candidate (K+1)-th page label having a maximum similarity with link information of the K-th page from the candidate (K+1)-th page labels of which link information is retrieved by the triggering and retrieving module as a real (K+1)-th page label;

a web page pre-loading module, configured to pre-load a (K+1)-th page according to link information of the real (K+1)-th page label selected by the main control module;

a text extraction module, configured to obtain text contents of the (K+1)-th page pre-loaded by the web page pre-loading module; and a content joining module, configured to join the text contents of the (K+1)-th page obtained by the text extraction module to the K-th page.

An embodiment of the disclosure also provides a computer storage medium having stored therein computer executable instructions used for executing the method for implementing intelligent reading on a browser according to the embodiment of the disclosure.

By means of the embodiments of the disclosure, a link address of the (K+1)-th page can be intelligently determined and accurately retrieved by comparing a similarity between a link address of the (K+1)-th page label and a link address of the K-th page, thereby the text contents of the (K+1)-th page are extracted and then joined to the previous page, and the reading experience of a user is improved greatly. By means of the technical solutions provided by the embodiments of the disclosure, the text contents of the multi-page news or novel web pages can be automatically joined together to allow the user to browse the contents easily without performing frequent page turning operation and waiting for a next page loading process.

DETAILED DESCRIPTION

The technical solutions of the embodiments of the disclosure are further described in detail below with reference to the drawings and specific embodiments to allow those skilled in the art to be able to better understand the embodiments of the disclosure and implement the embodiments, but the embodiments do not serve as limits to the disclosure.

Figure 1:
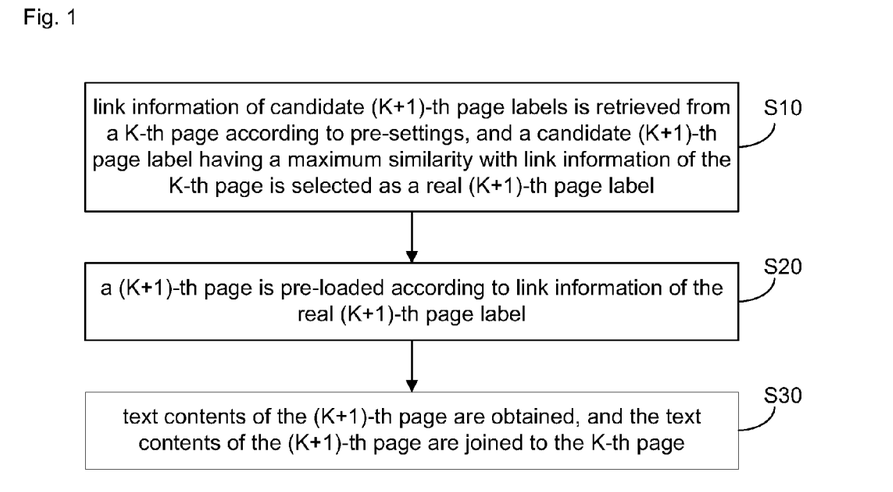
FIG. 1 is a flow diagram of a method for implementing intelligent reading on a browser according to an embodiment of the disclosure.

FIG. 1 is a flow diagram of a method for implementing intelligent reading on a browser according to an embodiment of the disclosure. As shown in FIG. 1, the method for implementing intelligent reading on a browser provided by an embodiment of the disclosure includes the steps as follows.

Step S10: link information of candidate (K+1)-th page labels is retrieved from a K-th page according to pre-settings, and a candidate (K+1)-th page label having a maximum similarity with link information of the K-th page is selected as a real (K+1)-th page label, K being a positive integer.

Step S20: a (K+1)-th page is pre-loaded according to link information of the real (K+1)-th page label.

Step S30: text contents of the (K+1)-th page are obtained, and the text contents of the (K+1)-th page are joined to the K-th page.

In Step S10 according to the embodiment, the step that the link information of the candidate (K+1)-th page labels is retrieved from the K-th page according to the pre-settings includes that: at least one (K+1)-th page loading identifier or automatic loading triggering policy is pre-set, and the link information of the candidate (K+1)-th page labels is retrieved from the K-th page according to the at least one (K+1)-th page loading identifier or automatic loading triggering policy, herein the (K+1)-th page loading identifier at least defines triggering the (K+1)-th page to be pre-loaded via a pre-set gesture or triggering the (K+1)-th page to be pre-loaded via a position of a vertical scroll bar, and the automatic loading triggering policy includes at least one mode of automatically triggering the (K+1)-th page to be pre-loaded via a pre-configured triggering rule.

In addition, a technology which is commonly known in other fields and can be used for triggering the (K+1)-th page to be loaded can also be defined to the (K+1)-th page loading identifier, and detailed description thereof will be omitted herein.

Moreover, in addition to retrieval of the candidate (K+1)-th page labels through a triggering operation of a user, other implementation modes (namely the automatic loading triggering policy according to the embodiment of the disclosure) of directly retrieving functions of the candidate (K+1)-th page labels without the triggering operation of the user can be adopted. For example, in an embodiment, as long as the user opens a browser, a system will automatically retrieve the candidate (K+1)-th page labels, and a (K+1)-th page text joining function will be automatically started. Or, in another embodiment, the automatic loading triggering policy can be pre-configured to start a function of automatically retrieving the candidate (K+1)-th page labels when the user opens the browser and there is an available network currently, and the automatic loading triggering policy can be specifically designed by those skilled in the art according to knowledge generally mastered thereby in a specific situation, and will not be described in detail here one by one.

Figure 2:
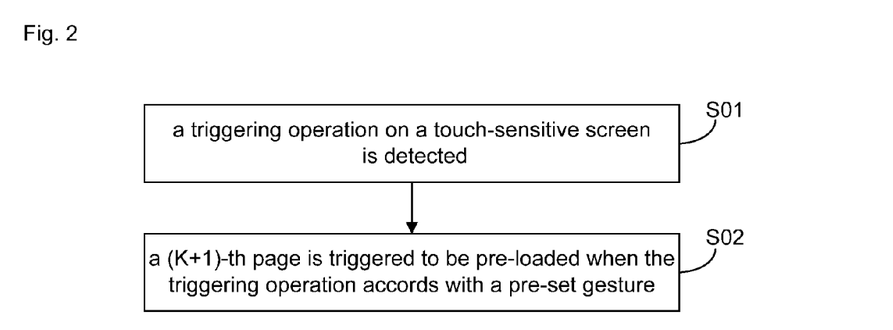
FIG. 2 is a flow diagram of triggering a (K+1)-th page to be pre-loaded via a pre-set gesture according to an embodiment of the disclosure.

For example, FIG. 2 is a flow diagram of triggering a (K+1)-th page to be pre-loaded via a pre-set gesture according to an embodiment of the disclosure. As shown in FIG. 2, triggering the (K+1)-th page to be pre-loaded via the pre-set gesture includes:

Step S01: detecting a triggering operation on a touch-sensitive screen; and

Step S02: when the triggering operation accords with the pre-set gesture, triggering the (K+1)-th page to be pre-loaded.

Figure 3:
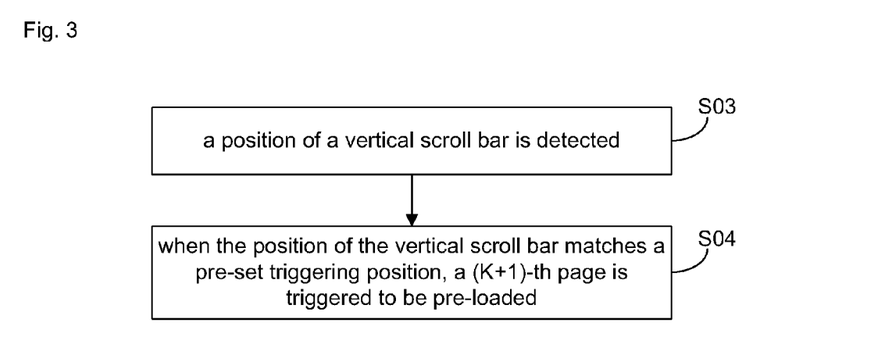
FIG. 3 is a flow diagram of triggering a (K+1)-th page to be pre-loaded via a position of a vertical scroll bar according to an embodiment of the disclosure.

Or, FIG. 3 is a flow diagram of triggering a (K+1)-th page to be pre-loaded via a position of a vertical scroll bar according to an embodiment of the disclosure. As shown in FIG. 3, triggering the (K+1)-th page to be pre-loaded via the position of the vertical scroll bar includes:

Step S03: detecting the position of the vertical scroll bar; and

Step S04: when the position of the vertical scroll bar matches a pre-set triggering position, triggering the (K+1)-th page to be pre-loaded.

Figure 4:
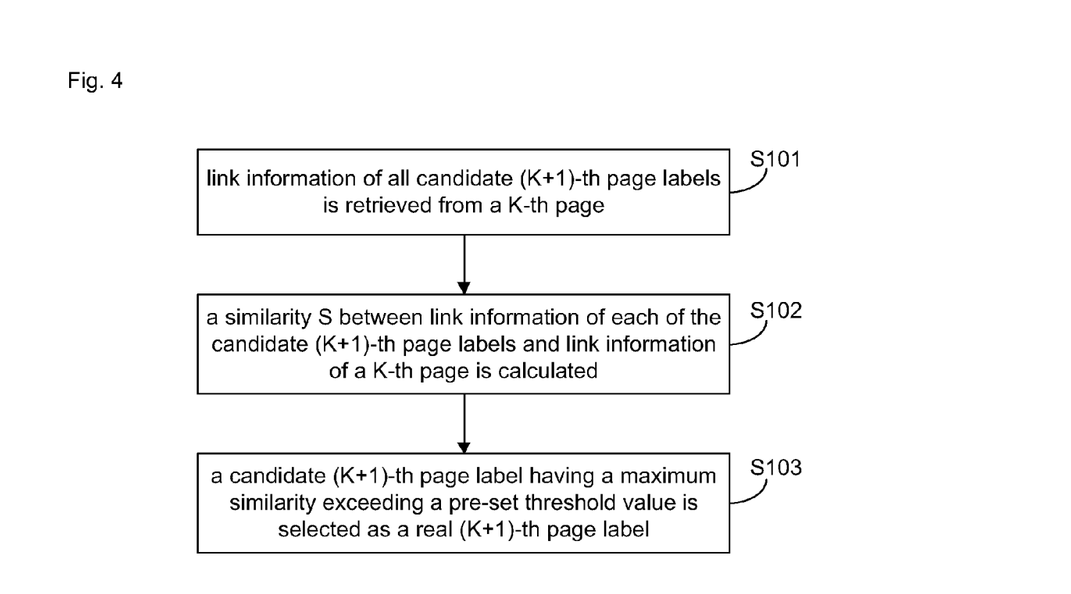
FIG. 4 is a flow diagram of selecting a real (K+1)-th page label from candidate (K+1)-th page labels according to an embodiment of the disclosure.

In the embodiment, FIG. 4 is a flow diagram of selecting a real (K+1)-th page label from candidate (K+1)-th page labels according to an embodiment of the disclosure. As shown in FIG. 4, selecting the real (K+1)-th page label from the candidate (K+1)-th page labels includes:

Step S101: retrieving link information of all candidate (K+1)-th page labels from the K-th page;

Step S102: calculating a similarity S between link information of each of the candidate (K+1)-th page labels and the link information of the K-th page, the similarity S satisfying the following expression:

S=T/N, where T is the number of identical characters of the link information of the each of the candidate (K+1)-th page labels and the link information of the K-th page at identical positions, and N is the number of characters of the link information of the K-th page; and Step S103: selecting a candidate (K+1)-th page label having a maximum similarity exceeding a pre-set threshold value as the real (K+1)-th page label.

Figure 5:
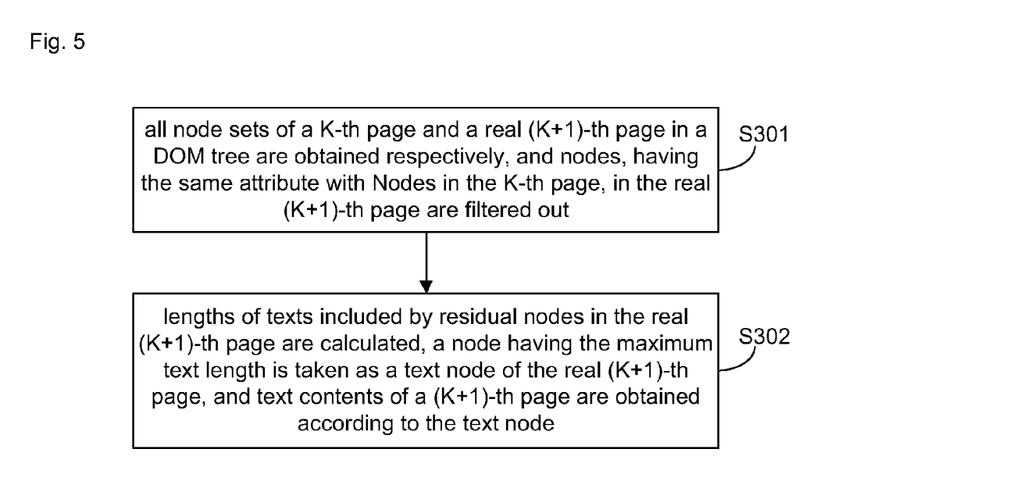
FIG. 5 is a flow diagram of obtaining text contents of a (K+1)-th page according to link information of the real (K+1)-th page label according to an embodiment of the disclosure.

In the embodiment, FIG. 5 is a flow diagram of obtaining text contents of a (K+1)-th page according to link information of the real (K+1)-th page label according to an embodiment of the disclosure. As shown in FIG. 5, obtaining the text contents of the (K+1)-th page according to the link information of the real (K+1)-th page label includes:

Step S301: obtaining all node sets of the K-th page and a real (K+1)-th page in a DOM tree respectively, and filtering out nodes, having the same attribute with nodes in the K-th page, in the real (K+1)-th page; and Step S302: calculating lengths of texts included in residual nodes in the real (K+1)-th page, taking a node having the maximum text length as a text node of the real (K+1)-th page, and obtaining the text contents of the (K+1)-th page according to the text node.

Specifically, by taking a mode of triggering the (K+1)-th page to be pre-loaded via the position of the vertical scroll bar as an example, the method for implementing intelligent reading on a browser includes the steps as follows.

Step 100: it is determined whether a coordinate position of a vertical scroll bar of a web page reaches the tail end of a text of the web page, Step 100 is continuously executed when a determination result is NO, and Step 110 is executed when the determination result is YES.

Step 110: a link address of a next page label is retrieved in a range of the web page (specific retrieval steps refer to subsequent steps namely Step 200 to Step 230), if it is determined that the link address of the next page label is not retrieved, the operation is quit, and if it is determined that the link address of the next page label is retrieved, Step 120 is executed.

Step 120: a web page downloading flow is initiated backstage according to the obtained link address of the next page label to obtain successfully-downloaded next page data.

Step 130: text contents in the successfully-downloaded next page data are extracted (specific text extraction steps refer to subsequent steps namely Step 300 to Step 350).

Step 140: the text contents of a next page are jointed to the tail of the text of the web page.

Step 150: Step 100 is re-executed, and a new process of retrieving, downloading, extracting and joining the next page starts to be carried out.

By means of the steps, as a user controls and adjusts the vertical scroll bar, the text contents of the next page will be automatically joined to the tail of the text of the web page, and therefore it is unnecessary for the user to frequently turn a page and wait for a next page loading process.

Two key processes namely retrieval of the link address of the next page and extraction of the text contents in the above-mentioned steps are specifically explained next, and are explained in detail below.

Step 110 that the link address of the next page label is retrieved in the range of the web page includes that:

Step 200: all link nodes namely a label <a> node set are retrieved in a page;

Step 210: candidate nodes including one of 'next page text set' elements are screened from the label <a> node set, the 'next page text set' elements mainly including, but not limited to, the following text attribute link nodes: next pages, a next page, next and the like;

Step 220: similarity calculation is performed on each of link addresses of the screened candidate nodes and a link address of the page to obtain a similarity value, the similarity satisfying the following expression:

the similarity value is obtained by dividing the number of identical characters of two link addresses at identical positions by the number of characters of the link address of the page; and Step 230: a candidate node having a maximum similarity value exceeding a certain threshold value (80%, for example) is taken as a next page node of the page, and a link address corresponding to the next page node is extracted.

The link address of the next page with respect to the page can be accurately extracted by processing in the steps, thereby avoiding wrong selection and missing selection caused by a conventional method.

Step 130 that the text contents in the successfully-downloaded next page data are extracted includes that:

Step 300: contents of the page and the next page are input, a next page node of the page is found, and all node sets in front of the next page node in the DOM tree are obtained;

Step 310: candidate node labels such as <h*>, <t> and <b> probably including the text contents are screened in the node sets; and Step 320: the contents of the page and the next page are searched according to the obtained candidate node labels, if it is determined that the page and the next page include nodes of which node labels and node label attributes are identical, the nodes of which the node labels and the node label attributes are identical are filtered.

Step 320 is explained in detail by taking reading of a Xinhuanet page via a mobile phone as an example.

Main contents of a source code of a first page of a certain Newsnet page are as follows:

<h3 class="title">a public prosecution is initiated to a capital airport bombing suspect</h3>
<div class="meta">
<span>publishing time: 2013-08-29 11:34</span>
</div>
<div class="content">
<p>the Chaoyang procuratorate initiates a public prosecution to a capital airport bombing suspect Ji Zhongxing</p>

<p>the Beijing Chaoyang people's procuratorate initiates a public prosecution to a capital airport bombing criminal suspect Ji Zhongxing suspected of bombing on Aug. 29, 2013 according to the law.</p>

<p>it is found out, by legal examination, that: Ji Zhongxing carried a homemade explosion apparatus on Jul. 20, 2013, came to Beijing alone from the place of residence in Shandong Province by bus, and detonated the homemade explosion apparatus at an international passenger arrival exit B on the second floor of a terminal 3 in the Beijing capital international airport at 18:00 in the evening, he was seriously injured, and a policeman was slightly injured at the same time. An explosion scene was disordered, and an international passenger arrival exit passage was closed in emergency. Ji Zhongxing was caught by the public security bureau at the scene later.</p>

</div>

After a second page of the web page is pre-loaded, main contents of a source code of the second page are as follows:

<h3 class="title">a public prosecution is initiated to a capital airport bombing suspect</h3>
<div class="meta">
<span>publishing time: 2013-08-29 11:34</span>
</div>
<div class="content">
<p>article 114 in *the Criminal Law of the People's Republic of China*: whoever commits arson, breaches a dike, causes explosion, spreads poisonous substances, radioactive substances, infectious pathogen substances and other substances or uses other dangerous means to endanger public security, but causing no serious consequences, shall be sentenced to fixed-term imprisonment of not less than 3 years but not more than 10 years.</p>
</div>
</div>

Obviously, in the two pages, the title, the publishing time and the like are repeated contents, each node of the first page is compared with a node label of the second page to find the nodes of the first page <h3 class="title">a public prosecution is initiated to a capital airport bombing suspect</h3> and <div class="meta"> <span>publishing time: 2013-08-29 11:34</span> </div>, and label names and contents in the labels are identical to corresponding contents in the second page. Thus, these nodes are filtered, and contents corresponding to remaining text labels of the second page are as follows:

<div class="content">
<p>article 114 in *the Criminal Law of the People's Republic of China*: whoever commits arson, breaches a dike, causes explosion, spreads poisonous substances, radioactive substances, infectious pathogen substances and other substances or uses other dangerous means to endanger public security, but causing no serious consequences, shall be sentenced to fixed-term imprisonment of not less than 3 years but not more than 10 years.</p>
</div>

Step 330: Lengths of texts included by residual candidate nodes are calculated.

Step 340: A node having a maximum text length is taken as a text node of the next page to obtain an Identifier (ID) or class name corresponding to a node label having the maximum text length. In a practical situation, if the ID or class name of the node label is null, an ID or class name corresponding to a father node of the node is obtained, and the rest may be deduced by analogy until the ID or class name of the node label is obtained.

Step 350: A corresponding text label node is found in the next page via the node label ID or class name, and the text contents of the next page are extracted from the text label node to be used for joining web pages.

By processing in the steps, text parts in a next news or novel web page can be automatically extracted to be jointed to the lower side of a text of a current web page, interference from duplicate contents of other node in the next web page is avoided to the greatest extent, and the user can clearly read the contents of the whole news or the whole novel, thereby providing excellent reading experience for the user.

An embodiment of the disclosure also provides a computer storage medium having stored therein computer executable instructions used for executing the method for implementing intelligent reading on a browser according to the embodiment of the disclosure.

Figure 6:
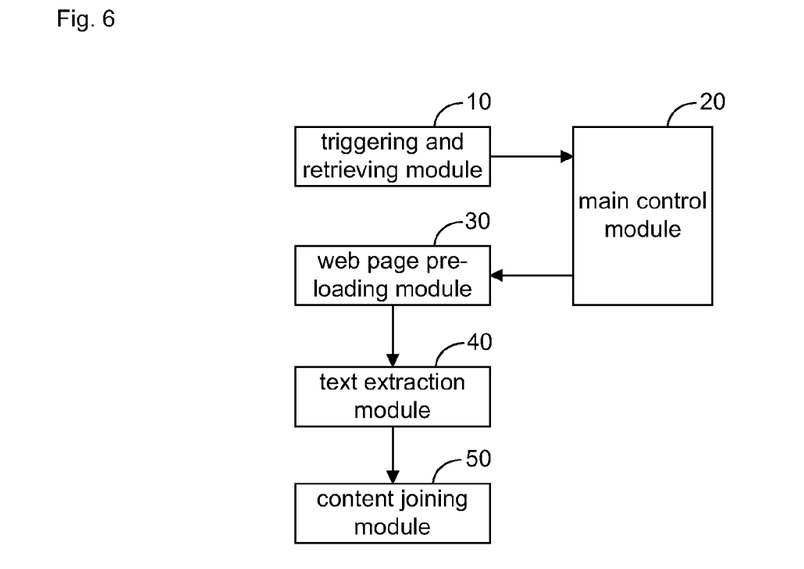
FIG. 6 is a structural diagram of an apparatus for implementing intelligent reading on a browser according to an embodiment of the disclosure.

FIG. 6 is a structural diagram of an apparatus for implementing intelligent reading on a browser according to an embodiment of the disclosure. As shown in FIG. 6, an embodiment of the disclosure also provides an apparatus for implementing intelligent reading on a browser, which includes:

a triggering and retrieving module 10, configured to retrieve link information of candidate (K+1)-th page labels from a K-th page according to pre-settings, K being a positive integer;

a main control module 20, configured to select a candidate (K+1)-th page label having a maximum similarity with link information of the K-th page from the candidate (K+1)-th page labels of which link information is retrieved by the triggering and retrieving module 10 as a real (K+1)-th page label;

a web page pre-loading module 30, configured to pre-load a (K+1)-th page according to link information of the real (K+1)-th page label selected by the main control module 20;

a text extraction module 40, configured to obtain text contents of the (K+1)-th page pre-loaded by the web page pre-loading module 30; and a content joining module 50, configured to join the text contents of the (K+1)-th page obtained by the text extraction module 40 to the K-th page.

In the embodiment, the triggering and retrieving module 10 is configured to pre-set at least one (K+1)-th page loading identifier or automatic loading triggering policy, and retrieve the link information of the candidate (K+1)-th page labels from the K-th page according to the at least one (K+1)-th page loading identifier or automatic loading triggering policy, herein the (K+1)-th page loading identifier at least defines triggering the (K+1)-th page to be pre-loaded via a pre-set gesture or triggering the (K+1)-th page to be pre-loaded via a position of a vertical scroll bar, and the automatic loading triggering policy includes at least one mode of automatically triggering the (K+1)-th page to be pre-loaded via a pre-configured triggering rule.

In the embodiment, the triggering and retrieving module 10 is configured to detect a triggering operation on a touch-sensitive screen, and trigger the (K+1)-th page to be pre-loaded when the triggering operation accords with the pre-set gesture.

In the embodiment, the triggering and retrieving module 10 is configured to detect the position of the vertical scroll bar, and trigger the (K+1)-th page to be pre-loaded when the position of the vertical scroll bar matches a pre-set triggering position.

In the embodiment, the main control module 20 is configured to: retrieve link information of all candidate (K+1)- th page labels from the K-th page; calculate a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and select a candidate (K+1)-th page label having a maximum similarity exceeding a pre-set threshold value as the real (K+1)-th page label.

In the embodiment, the text extraction module 40 is configured to obtain all node sets of the K-th page and a real (K+1)-th page in a DOM tree respectively, filter out nodes, having the same attribute with nodes in the K-th page, in the real (K+1)-th page, calculate lengths of texts included in residual nodes in the real (K+1)-th page, take a node having the maximum text length as a text node of the real (K+1)-th page, and obtain the text contents of the (K+1)-th page according to the text node.

Figure 7:
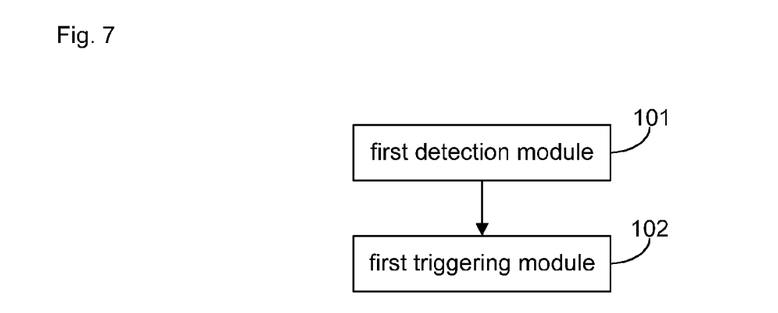
FIG. 7 is a structural diagram of a triggering and retrieving module according to an embodiment of the disclosure.

In an implementation mode, FIG. 7 is a structural diagram of a triggering and retrieving module according to an embodiment of the disclosure. As shown in FIG. 7, the triggering and retrieving module 10 includes:

a first detection module 101, configured to detect a triggering operation on a touch-sensitive screen; and a first triggering module 102, configured to trigger a (K+1)-th page to be loaded when the triggering operation detected by the first detection module accords with a pre-set gesture.

Figure 8:
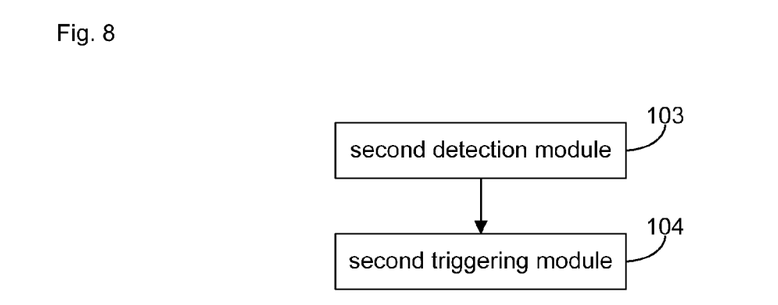
FIG. 8 is a structural diagram of a triggering and retrieving module according to another embodiment of the disclosure.

In another implementation mode, FIG. 8 is a structural diagram of a triggering and retrieving module according to another embodiment of the disclosure. As shown in FIG. 8, the triggering and retrieving module 10 includes:

a second detection module 103, configured to detect a position of a vertical scroll bar; and a second triggering module 104, configured to trigger a (K+1)-th page to be pre-loaded when the position of the vertical scroll bar, detected by the second detection module 103, matches a pre-set triggering position.

Figure 9:
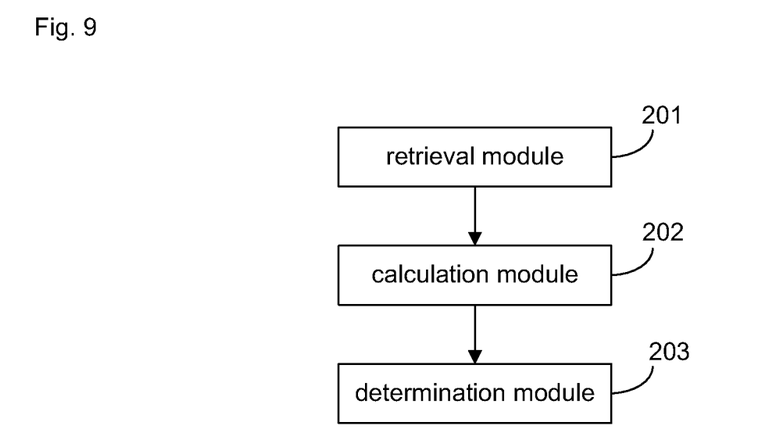
FIG. 9 is a structural diagram of a main control module according to an embodiment of the disclosure.

In the embodiment, FIG. 9 is a structural diagram of a main control module according to an embodiment of the disclosure. As shown in FIG. 9, the main control module 20 includes:

a retrieval module 201, configured to retrieve link information of all candidate (K+1)-th page labels from a K-th page;

a calculation module 202, configured to calculate a similarity S between the link information, of the each of the candidate (K+1)-th page labels, retrieved by the retrieval module 201 and link information of the K-th page, the similarity S satisfying the following expression:

$S=T/N$, where T is the number of identical characters of the link information of the each of the candidate (K+1)-th page labels and the link information of the K-th page at identical positions, and N is the number of characters of the link information of the K-th page; and a determination module 203, configured to select a candidate (K+1)-th page label having a maximum similarity exceeding a pre-set threshold value as a real (K+1)-th page label according to a calculation result of the calculation module 202.

Figure 10:
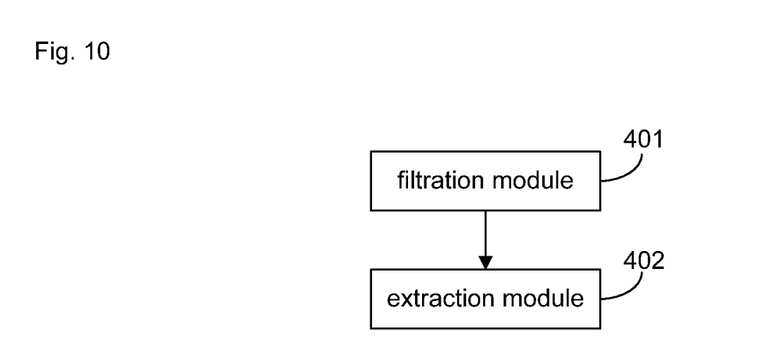
FIG. 10 is a structural diagram of a text extraction module according to an embodiment of the disclosure.

In the embodiment, FIG. 10 is a structural diagram of a text extraction module according to an embodiment of the disclosure. As shown in FIG. 10, the text extraction module 40 includes:

a filtration module 401, configured to obtain all node sets of a K-th page and a real (K+1)-th page in a DOM tree respectively, and filter nodes, having the same attribute with nodes in the K-th page, in the real (K+1)-th page; and an extraction module 402, configured to calculate lengths of texts included in residual nodes in the real (K+1)-th page, take a node having the maximum text length as a text node of the real (K+1)-th page, and obtain text contents of a (K+1)-th page according to the text node.

In the embodiment of the disclosure, the apparatus for implementing intelligent reading on a browser can be implemented via intelligent terminals such as a smart phone, a tablet personal computer or an all-in-one computer in practical application. In practical application, the triggering and retrieving module 10, the main control module 20, the web page pre-loading module 30, the text extraction module 40, the content joining module 50, sub-modules namely the first detection module 101 and the first triggering module 102 or the second detection module 103 and the second triggering module 104 in the triggering and retrieving module 10, sub-modules namely the retrieval module 201, the calculation module 202 and the determination module 203 in the main control module 20, and sub-modules namely the filtration module 401 and the extraction module 402 in the text extraction module 40 in the apparatus for implementing intelligent reading on a browser can be implemented by a Central Processing Unit (CPU), a Digital Signal Processor (DSP) or a Field Programmable Gate Array (FPGA) in the apparatus.

An embodiment of the disclosure also provides a terminal, which includes the apparatus for implementing intelligent reading on a browser according to the embodiment of the disclosure. As shown in FIG. 6, the terminal includes:

a triggering and retrieving module 10, configured to retrieve link information of candidate (K+1)-th page labels from a K-th page according to pre-settings, K being a positive integer;

a main control module 20, configured to select a candidate (K+1)-th page label having a maximum similarity with link information of the K-th page from the candidate (K+1)-th page labels of which link information is retrieved by the triggering and retrieving module 10 as a real (K+1)-th page label;

a web page pre-loading module 30, configured to pre-load a (K+1)-th page according to link information of the real (K+1)-th page label selected by the main control module 20;

a text extraction module 40, configured to obtain text contents of the (K+1)-th page pre-loaded by the web page pre-loading module 30; and a content joining module 50, configured to join the text contents of the (K+1)-th page obtained by the text extraction module 40 to the K-th page.

In the embodiment, the triggering and retrieving module 10 is configured to pre-set at least one (K+1)-th page loading identifier or automatic loading triggering policy, and retrieve the link information of the candidate (K+1)-th page labels from the K-th page according to the at least one (K+1)-th page loading identifier or automatic loading triggering policy, herein the (K+1)-th page loading identifier at least defines triggering the (K+1)-th page to be pre-loaded via a pre-set gesture or triggering the (K+1)-th page to be pre-loaded via a position of a vertical scroll bar, and the automatic loading triggering policy includes at least one mode of automatically triggering the (K+1)-th page to be pre-loaded via a pre-configured triggering rule.

In the embodiment, the triggering and retrieving module 10 is configured to detect a triggering operation on a touch-sensitive screen, and trigger the (K+1)-th page to be pre-loaded when the triggering operation accords with the pre-set gesture.

In the embodiment, the triggering and retrieving module 10 is configured to detect the position of the vertical scroll bar, and trigger the (K+1)-th page to be pre-loaded when the position of the vertical scroll bar matches a pre-set triggering position.

In the embodiment, the main control module 20 is configured to: retrieve link information of all candidate (K+1)-th page labels from the K-th page; calculate a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and select a candidate (K+1)-th page label having a maximum similarity exceeding a pre-set threshold value as the real (K+1)-th page label.

In the embodiment, the text extraction module 40 is configured to obtain all node sets of the K-th page and a real (K+1)-th page in a DOM tree respectively, filter out nodes, having the same attribute with nodes in the K-th page, in the real (K+1)-th page, calculate lengths of texts included by residual nodes in the real (K+1)-th page, take a node having the maximum text length as a text node of the real (K+1)-th page, and obtain the text contents of the (K+1)-th page according to the text node.

Herein, the structure of the triggering and retrieving module 10 is shown in FIG. 7 or FIG. 8. The structure of the main control module 20 is shown in FIG. 9. The structure of the text extraction module 40 is shown in FIG. 10. Specific explanations for the triggering and retrieving module 10, the main control module 20 and the text extraction module 40 refer to detailed descriptions shown in FIG. 7 to FIG. 10, and are no longer repeated.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for implementing functions designated in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus implements the functions designated in one or more flows of the flowcharts and/or one or more blocks of the block diagrams.

These computer program instructions can also be loaded to the computers or the other programmable data processing devices, so that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

The above is only implementation modes of the embodiments of the disclosure. It should be pointed out that those skilled in the art can also make some improvements and modifications without departing from the principle of the embodiments of the disclosure. These improvements and modifications should fall within the protection scope of the embodiments of the disclosure.

INDUSTRIAL APPLICABILITY

By means of the embodiments of the disclosure, the link address of the (K+1)-th page can be intelligently determined and accurately retrieved by comparing the similarity between the link address of the (K+1)-th page label and the link address of the K-th page, thereby the text contents of the (K+1)-th page are extracted and then joined to the previous page, and greatly improving the reading experience of the user is improved greatly. By means of the technical solutions provided by the embodiments of the disclosure, the text contents of the multi-page news or novel web pages can be automatically joined together to allow the user to browse the contents easily without performing frequent page turning operation and waiting for the next page loading process.

What is claimed is:

1. A method for implementing intelligent reading on a browser, comprising:
   starting, by a terminal, the browser installed in the terminal;
   retrieving, by the terminal, link information of candidate (K+1)-th page labels from a K-th page according to pre-settings, and selecting, by the terminal, a candidate (K+1)-th page label having a maximum similarity with link information of the K-th page as a real (K+1)-th page label, K being a positive integer;
   pre-loading, by the terminal, a (K+1)-th page according to link information of the real (K+1)-th page label; and
   obtaining, by the terminal, text contents of the (K+1)-th page, and joining the text contents of the (K+1)-th page to the K-th page;
   displaying the joined text contents of the (K+1)-th page and the K-th page in a screen of the terminal, wherein selecting the candidate (K+1)-th page label having the maximum similarity with the link information of the K-th page as the real (K+1)-th page label comprises:
retrieving link information of all candidate (K+1)-th page labels from the K-th page;
calculating a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and
selecting a candidate (K+1)-th page label having a maximum similarity exceeding a pre-set threshold value as the real (K+1)-th page label.

2. The method for implementing intelligent reading on a browser according to claim 1, wherein retrieving the link information of the candidate (K+1)-th page labels from the K-th page according to the pre-settings comprises: pre-setting at least one (K+1)-th page loading identifier or automatic loading triggering policy, and retrieving the link information of the candidate (K+1)-th page labels from the K-th page according to the at least one (K+1)-th page loading identifier or automatic loading triggering policy,
wherein the (K+1)-th page loading identifier at least defines: triggering the (K+1)-th page to be pre-loaded via a pre-set gesture or triggering the (K+1)-th page to be pre-loaded via a position of a vertical scroll bar, and the automatic loading triggering policy comprises at least one mode of automatically triggering the (K+1)-th page to be pre-loaded via a pre-configured triggering rule.

3. The method for implementing intelligent reading on a browser according to claim 2, wherein triggering the (K+1)-th page to be pre-loaded via the pre-set gesture comprises:
detecting a triggering operation on a touch-sensitive screen; and
when the triggering operation accords with the pre-set gesture, triggering the (K+1)-th page to be pre-loaded.

4. The method for implementing intelligent reading on a browser according to claim 2, wherein triggering the (K+1)-th page to be pre-loaded via the position of the vertical scroll bar comprises:
detecting the position of the vertical scroll bar; and
when the position of the vertical scroll bar matches a pre-set triggering position, triggering the (K+1)-th page to be pre-loaded.

5. The method for implementing intelligent reading on a browser according to claim 1, wherein obtaining the text contents of the (K+1)-th page comprises:
obtaining all node sets of the K-th page and a real (K+1)-th page in a Document Object Model (DOM) tree respectively, and filtering out nodes, having the same attribute with nodes in the K-th page, in the real (K+1)-th page; and
calculating lengths of texts included in residual nodes in the real (K+1)-th page, taking a node having the maximum text length as a text node of the real (K+1)-th page, and obtaining the text contents of the (K+1)-th page according to the text node.

6. An apparatus for implementing intelligent reading on a browser, comprising:

a memory storing processor-executable instructions; and
a processor arranged to execute the stored processor-executable instructions to perform steps of:
starting, by a terminal, the browser installed in the terminal;
retrieving, by a terminal, link information of candidate (K+1)-th page labels from a K-th page according to pre-settings, K being a positive integer;
selecting, by the terminal, a candidate (K+1)-th page label having a maximum similarity with link information of the K-th page from the candidate (K+1)-th page labels as a real (K+1)-th page label;
pre-loading, by the terminal, a (K+1)-th page according to link information of the real (K+1)-th page label;
obtaining, by the terminal, text contents of the (K+1)-th page; and
joining, by the terminal, the text contents of the (K+1)-th page to the K-th page,
displaying the joined text contents of the (K+1)-th page and the K-th page in a screen of the terminal,
wherein the processor is arranged to execute the stored processor-executable instructions to further perform a step of: retrieving link information of all candidate (K+1)-th page labels from the K-th page; calculate a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and
select a candidate (K+1)-th page label having a maximum similarity exceeding a pre-set threshold value as the real (K+1)-th page label.

7. The apparatus for implementing intelligent reading on a browser according to claim 6, wherein the processor is arranged to execute the stored processor-executable instructions to further perform a step of: pre-setting at least one (K+1)-th page loading identifier or automatic loading triggering policy, and retrieving the link information of the candidate (K+1)-th page labels from the K-th page according to the at least one (K+1)-th page loading identifier or automatic loading triggering policy,
wherein the (K+1)-th page loading identifier at least defines: triggering the (K+1)-th page to be pre-loaded via a pre-set gesture or triggering the (K+1)-th page to be pre-loaded via a position of a vertical scroll bar, and the automatic loading triggering policy comprising at least one mode of automatically triggering the (K+1)-th page to be pre-loaded via a pre-configured triggering rule.

8. The apparatus for implementing intelligent reading on a browser according to claim 7, wherein the processor is arranged to execute the stored processor-executable instructions to further perform a step of: detecting a triggering operation on a touch-sensitive screen, and trigger the (K+1)-th page to be pre-loaded when the triggering operation accords with the pre-set gesture.

9. The apparatus for implementing intelligent reading on a browser according to claim 7, wherein the processor is arranged to execute the stored processor-executable instructions to further perform a step of: detecting the position of the vertical scroll bar, and trigger the (K+1)-th page to be pre-loaded when the position of the vertical scroll bar matches a pre-set triggering position.

10. The apparatus for implementing intelligent reading on a browser according to claim 6, wherein the processor is arranged to execute the stored processor-executable instructions to further perform a step of: obtaining all node sets of the K-th page and a real (K+1)-th page in a Document Object Model (DOM) tree respectively, filter out nodes, having the same attribute with nodes in the K-th page, in the real (K+1)-th page, calculating lengths of texts included in residual nodes in the real (K+1)-th page, taking a node having the maximum text length as a text node of the real (K+1)-th page, and obtaining the text contents of the (K+1)-th page according to the text node.

11. A terminal, comprising an apparatus for implementing intelligent reading on a browser, the apparatus comprising:
    a memory storing processor-executable instructions; and
    a processor arranged to execute the stored processor-executable instructions to perform steps of:
        starting, by the terminal, the browser installed in the terminal;
        retrieving, by the terminal, link information of candidate (K+1)-th page labels from a K-th page according to pre-settings, K being a positive integer;
        selecting by the terminal, a candidate (K+1)-th page label having a maximum similarity with link information of the K-th page from the candidate (K+1)-th page labels as a real (K+1)-th page label;
        pre-loading, by the terminal, a (K+1)-th page according to link information of the real (K+1)-th page label;
        obtaining, by the terminal, text contents of the (K+1)-th page; and
        joining, by the terminal, the text contents of the (K+1)-th page obtained by the text extraction module to the K-th page,
        displaying the joined text contents of the (K+1)-th page and the K-th page in a screen of the terminal,
        wherein the processor is arranged to execute the stored processor-executable instructions to further perform a step of: retrieving link information of all candidate (K+1)-th page labels from the K-th page; calculate a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and
    selecting a candidate (K+1)-th page label having a maximum similarity exceeding a pre-set threshold value as the real (K+1)-th page label.

12. A non-transitory computer storage medium having stored therein computer executable instructions configured to execute a method for implementing intelligent reading on a browser, the method comprising:
    starting, by a terminal, the browser installed in the terminal;
    retrieving, by a terminal, link information of candidate (K+1)-th page labels from a K-th page according to pre-settings, and selecting a candidate (K+1)-th page label having a maximum similarity with link information of the K-th page as a real (K+1)-th page label, K being a positive integer;
    pre-loading, by the terminal, a (K+1)-th page according to link information of the real (K+1)-th page label; and
    obtaining, by the terminal, text contents of the (K+1)-th page, and joining the text contents of the (K+1)-th page to the K-th page,
    displaying the joined text contents of the (K+1)-th page and the K-th page in a screen of the terminal,
    wherein selecting the candidate (K+1)-th page label having the maximum similarity with the link information of the K-th page as the real (K+1)-th page label comprises:
    retrieving link information of all candidate (K+1)-th page labels from the K-th page;
    calculating a similarity S between link information of each of the candidate (K+1)-th page labels and the link information of the K-th page, the similarity S satisfying the following expression:

$$S=T/N,$$

where T is the number of identical characters of the link information of the each of the candidate (K+1)-th page labels and the link information of the K-th page at identical positions, and N is the number of characters of the link information of the K-th page; and
    selecting a candidate (K+1)-th page label having a maximum similarity exceeding a pre-set threshold value as the real (K+1)-th page label.

* * * * *